E. B. Beach,
Fish Trap.
No. 85,199.      Patented Dec. 22. 1868.
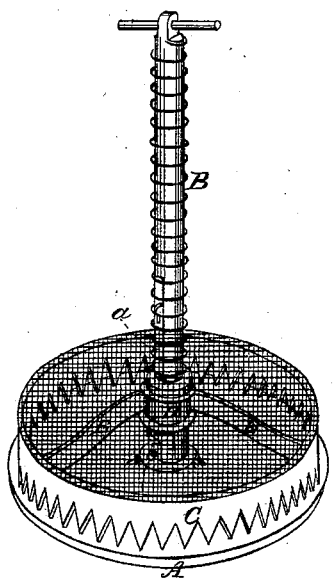
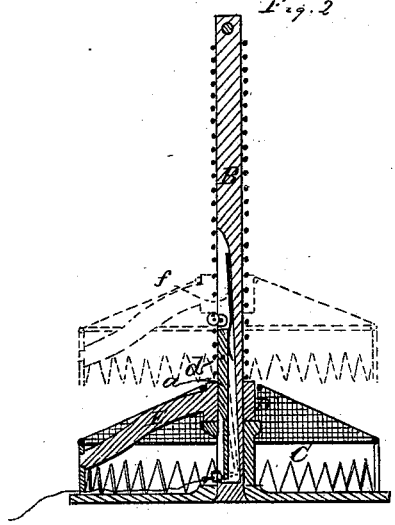

E. B. BEACH, OF WEST MERIDEN, CONNECTICUT.

*Letters Patent No. 85,199, dated December 22, 1868.*

FISH-TRAP.

The Schedule referred to in these Letters Patent and making part of the same.

*To all whom it may concern:*

Be it known that I, E. B. BEACH, of West Meriden, in the county of New Haven, and State of Connecticut, have invented a new Improvement in Fish-Trap; and I do hereby declare the following, when taken in connection with the accompanying drawings, and the letters of reference marked thereon, to be a full, clear, and exact description of the same, and which said drawings constitute part of this specification, and represent, in—

Figure 1, a perspective view, and in

Figure 2, a vertical section, illustrating the operation of the trap.

This invention, though designed especially with reference to fish-catching, is equally applicable to the catching of animals; the object being to construct a trap which may be attached to a line and sunk in the water, so that the fish touching the bait cannot escape from the trap. To this end, The invention consists in a central upright spindle, rising from a plate, of any desired form, (I prefer a round plate,) and upon the said spindle is arranged a toothed ring, of the same or little less diameter than the plate, that is, if the plate be round, or may correspond to the plate, whatever may be its form, the hub of the said ring moving freely up and down upon the spindle, and arranged with a spring, the tendency of which is to force the toothed ring down upon the plate, and the spindle provided with a lever or catch, which will hold the toothed ring suspended above the plate, and to which lever the bait is attached, so that the fish or animal taking the bait will so operate upon the lever as to release the toothed ring, which will be forced at once, by the action of the spring, down upon the fish or animal, and so as to secure it in the trap.

In order to the clear understanding of my invention, I will fully describe the same, as illustrated in the accompanying drawings.

A is a plate, of any desired form, and of a size proportionate to the purpose for which the trap is designed; and from the centre rises a spindle, B, set firmly upon the plate.

C is a metallic ring, provided with teeth upon its lower edge, and may be of any desired form, but should correspond to the form of the plate, and if round, of a little less diameter than the plate.

The ring C is fixed to a hub, D, by arms E, or otherwise, the said hub being fitted to the spindle B, so as to move freely up and down thereon.

Above the said hub, I arrange a spring around the spindle, as denoted in fig. 1, the tendency of which is to force the ring hard down upon the plate.

In the said spindle is arranged a lever, $a$, (see fig. 2,) upon a fulcrum, $d$, and provided with a spring, or its equivalent, $f$, bearing lightly against its upper end, so as to force the said upper end outward; the lower end extending down near the plate, and to which the bait is attached, in any convenient manner, so that when the bait is taken, and the lower end of the lever pulled outward, the upper end will consequently move inward; and the said upper end arranged so that when the ring is raised to the position denoted in red, it will be forced out under or into the said hub, so as to catch and hold the said ring suspended, as denoted in red.

Therefore, when the fish or animal takes the bait, the lever is forced from under the hub, releasing the ring, which instantly falls downward, and, by its toothed edge, catches or holds the fish or animal taking the bait.

To prevent taking the bait over the ring, I cover the ring with a netting, of any suitable material, or cover it in any manner, to prevent the fish or animal from taking the bait over the ring.

For catching fish, a line is attached to the upper end of the spindle, the lever provided with a bait, so that the bait will lie within the limit of the ring, then the trap is sunk in water, and the fish taking the bait is positively trapped, and cannot escape.

If for animals, the trap is set in the same manner, and placed in the proper position, according to the nature of the animal to be caught.

It will be observed that I have used the expression "ring C," but this I do in a general way, it being understood as including any desirable form for the toothed part of the trap.

Having thus fully described my invention,

What I claim as new and useful, and desire to secure by Letters Patent, is—

1. The central spindle B, hollow, or partly hollow, at its lower end, and having the spring-lever $a$ enclosed therein, in combination with the toothed ring C, and its netted covering, and the plate A, substantially as described, for the purposes of a trap, as set forth.

2. The pivoted lever $a$, enclosed within the spindle B, on which the trap C has its sliding motion, substantially as and for the purpose described.

3. The combination and arrangement of the central spindle B, spring-lever $a$, plate A, and the toothed ring C, substantially as and for the purpose described.

E. B. BEACH.

Witnesses:
S. O. CHURCH,
GEO. W. SMITH.